US005783057A

United States Patent [19]

Tomita et al.

[11] Patent Number: 5,783,057

[45] Date of Patent: Jul. 21, 1998

[54] METHOD OF PURIFYING COPPER ELECTROLYTIC SOLUTION

[75] Inventors: Masatoshi Tomita, Tokyo; Hiroshi Hiai; Toshinori Ishii, both of Hitachi, all of Japan

[73] Assignee: Nippon Mining & Metals Co., Ltd., Tokyo, Japan

[21] Appl. No.: 804,558

[22] Filed: Feb. 24, 1997

[30] Foreign Application Priority Data

Sep. 19, 1996 [JP] Japan .................................... 8-247958

[51] Int. Cl.$^{6}$ .............................. C25C 1/12; C25D 21/18

[52] U.S. Cl. ............................ 205/99; 205/101; 205/574; 205/586

[58] Field of Search .............................. 205/99, 101, 574, 205/586

[56] References Cited

U.S. PATENT DOCUMENTS

| | | | |
|---|---|---|---|
| 3,883,421 | 5/1975 | Cutting et al. | 209/1 |
| 3,917,519 | 11/1975 | Fisher et al. | 204/108 |
| 4,404,071 | 9/1983 | Abe et al. | 204/108 |

*Primary Examiner*—Kathryn L. Gorgos
*Assistant Examiner*—William T. Leader
*Attorney, Agent, or Firm*—Seidel, Gonda, Lavorgna & Monaco, PC

[57] ABSTRACT

A method of purifying a copper electrolytic solution circulated in a copper electrorefining system, wherein a portion of the solution is withdrawn and recycled to the system after purification treatment. The purification treatment includes the addition of a hydrosulfide to the withdrawn solution to generate only the necessary quantity of hydrogen sulfide gas required in the reaction. The hydrogen sulfide gas generated is utilized for purification treatment. One process comprises dividing the solution withdrawn into two portions. Sodium hydrosulfide is added to the first portion to precipitate and separate metals as sulfides. Excess sodium hydrosulfide is further added to the first portion for reaction with residual sulfuric acid in the solution to generate hydrogen sulfide gas, then contacting the second divided portion with the hydrogen sulfide gas thus produced to precipitate and separate metals in the form of sulfides. The filtrate is then recycled to an electrorefining system. There is also provided a process comprising contacting the solution with hydrogen sulfide gas to separate and remove Cu, As, Sb and Bi in the form of sulfides from the solution, then dividing the solution into two portions; The first portion is recycled to the electrorefining system, whereas excess sodium hydrosulfide is added to the second portion to separate and recover Ni as nickel sulfide from the solution. Resultant hydrogen sulfide gas is used for contact with solution to be treated.

8 Claims, 2 Drawing Sheets

COPPER ELECTROLYTIC SOLUTION
ELECTROWINNING
ELECTROLYTIC COPPER
SOLUTION AFTER ELECTROLYSIS
SOLUTION I
SOLUTION II
ADDITION OF SODIUM HYDROSULFIDE
HYDROGEN SULFIDE GAS
CONTACT REACTION
FILTRATION
SULFIDE I
FILTRATE
NEUTRALIZATION
FILTRATION
FILTRATION
SULFIDE II
FILTRATE
GYPSUM
FILTRATE
RECYCLED TO ELECTROREFINING PROCESS
NEUTRALIZATION
FILTRATION
NICKEL CARBONATE OR NICKEL HYDROXIDE
DRAINING

METHOD OF PURIFYING COPPER ELECTROLYTIC SOLUTION

BACKGROUND OF THE INVENTION

This invention relates to a method of purifying sulfuric acid containing copper electrolytic solution circulated in a copper electrorefining system in which crude copper is electrolytically refined to high purity electrolytic copper; in particular, this invention relates to a method of purifying a circulating copper electrolytic solution with removal of metals such as copper, arsenic, antimony, bismuth and the like, which gradually build up in the solution. This invention relates to a purifying method by which such metals, and especially nickel, can be separated and recovered.

In a system for electrorefining crude copper to high purity electrolytic copper, the progress of electrolysis entails gradual build up of copper, arsenic, antimony, bismuth, and the like, that have dissolved from the copper anode into the circulating copper electrolytic solution. The increase in the concentrations of the impurity metals (such as arsenic, antimony, and bismuth) leads to deterioration of the quality of the product copper. Moreover, the presence of excess copper adversely affects the properties of the electrolytic copper produced. It is therefore common practice to purify, at regular intervals, the electrolytic solution used in a copper electrorefining system.

A widely used method of purification comprises the steps of (1) heating a copper electrolytic solution to concentrate it; (2) separating and removing copper as copper sulfate from the solution by taking advantage of the differences in the solubilities of the components; (3) causing electrodeposition of the copper, arsenic, antimony, and bismuth remaining in the solution by electrowinning; and (4) finally cooling the solution and separating and recovering nickel as nickel sulfate taking advantage of the solubility difference. The filtrate resulting from the separation and recovery of nickel sulfate is returned to an electrolytic tank.

However, this method, which depends on electrowinning for the removal of arsenic, antimony, and bismuth, has the disadvantage of evolving highly toxic arsine gas ($As_3H$) during electrolysis. An additional demerit is the unusually large power consumption involved in the electrowinning.

Japanese Patent Application Kokai No. 57-5884 describes a method of treating a copper electrolytic solution. In this method, a copper electrorefined copper electrolytic solution is first treated to remove copper and then the copper-removed electrolytic solution is heated to no less than 40° C. Hydrogen sulfide gas is blown into the solution to a given potential to precipitate the metal values in the solution as sulfides. The next step requires filtration resulting in the precipitate to be used as raw material for copper refining and the filtrate to be recycled as copper electrolytic solution. Many problems, however, are involved in the handling of highly toxic hydrogen sulfide gas in a large quantity as indicated in this method. That is, this method necessitates the transport and storage of large quantities of highly toxic, high priced hydrogen sulfide gas. This method does not assure safe operation, which means that this method is an industrially unfeasible method.

In view of the above, the object of this invention is to establish an industrially feasible method for purifying a copper electrolytic solution being circulated in a copper electrorefining system. Such a method replaces the electrowinning-dependent separation method of arsenic, antimony, and bismuth which evolves highly toxic arsine gas. Such a method further renders unnecessary the transport and storage of large quantities of highly toxic, high-priced hydrogen sulfide gas, and assures safe operation.

BRIEF SUMMARY OF THE INVENTION

After intensive research focusing upon replacing the separation method of arsenic, antimony, and bismuth dependent upon electrowinning and evolving highly toxic arsine gas, attention was paid to the potential utility of the method of precipitating and separating these metals as sulfides. As stated above, however, the blowing of hydrogen sulfide gas into an electrolytic solution to precipitate and remove these metals as sulfides necessitates the transporting and handling of large quantities of highly toxic hydrogen sulfide, leaving the method industrially unfeasible.

Since it is acknowledged that an industrially effective separation method capable of overcoming those demerits requires sulfide precipitation, and that the copper electrolytic solution contains sulfuric acid, a new method has been developed wherein low-priced sodium hydrosulfide (NaHS) is added to a copper electrolytic solution containing sulfuric acid. The sodium hydrosulfide is added to generate only the necessary amount of high-priced hydrogen sulfide ($H_2S$) gas at the reaction site, which is to be blown into a copper electrolytic solution, so as to contribute to the separation reaction. Thus, by using low-priced sodium hydrosulfide to generate high-priced hydrogen sulfide gas only in the necessary amount and at the reaction site, an electrolytic solution may be treated efficiently and safely.

Actually, it has been found that this method may be utilized by dividing an electrolytic solution withdrawn from an electrorefining system into two portions. To the first portion of the solution is added sodium hydrosulfide to separate and remove copper, arsenic, antimony, and bismuth in the form of sulfides, and then further adding excess sodium hydrosulfide for reaction with residual sulfuric acid in the solution to generate hydrogen sulfide gas. The gas thus produced is contacted with the second solution to facilitate the separation and removal of sulfides of copper, arsenic, antimony, and bismuth from the second solution. The filtrate from the second solution is recycled to the electrorefining system.

Under the above background, this invention, in its first aspect, provides a method of purifying copper electrolytic solution being circulated in a copper electrorefining system. After a portion of the electrolytic solution is withdrawn from the system and subjected to purification treatment for preventing the buildup of impurities in the copper electrolytic solution, it is recycled to the system. A characteristic feature of this invention is that sodium hydrosulfide is added to the copper electrolytic solution to generate only the necessary amount of hydrogen sulfide gas at the reaction site and the hydrogen sulfide gas generated is utilized for purification treatment.

This invention also provides a method of purifying copper electrolytic solution being circulated in a copper electrorefining system wherein a portion of the electrolytic solution is withdrawn from the system and is recycled to the system after having been subjected to purification treatment for preventing the buildup of impurities in the copper electrolytic solution. This method requires dividing the electrolytic solution withdrawn into two portions, and adding sodium hydrosulfide to the first portion of the solution to precipitate and separate metals such as copper, arsenic, antimony, and bismuth in the form of sulfides. The method further requires adding excess sodium hydrosulfide to the first divided portion of the solution for reaction with residual sulfuric acid in the solution to generate hydrogen sulfide gas, and contacting the second divided portion of the solution with the hydrogen sulfide gas thus produced to precipitate and separate metal such as copper, arsenic, antimony, and bismuth in the form of sulfides from the second solution. The filtrate from the second solution is recycled to an electrolytic system. It is advantageous that slaked lime or calcium carbonate be added to the first divided portion of the solution to which sodium hydrosulfide is added. Slaked lime or calcium carbonate react with free sulfuric acid to form and precipitate gypsum. The solution from which the gypsum has been removed is then adjusted to pH 8 to 10 by the addition of sodium carbonate or caustic soda, so that impurities such as nickel, iron, or the like which could not have been removed are separated and removed as neutralized precipitate.

It is preferable to divide the copper electrolytic solution after having recovered almost all of the copper from the electrolytic solution withdrawn by electrowinning. It is better to pass the copper electrolytic solution through an ion exchange resin to separate a portion of antimony and/or bismuth, by allowing it to adsorb on the resin, before recovering the copper in the electrolytic solution withdrawn by electrowinning. It is also recommended to heat the electrolytic solution to evaporate water and to precipitate and separate copper as copper sulfate.

However, in the above method, as copper, arsenic antimony, and bismuth are separated and removed from the first divided portion of the solution in the form of sulfides upon the addition of sodium hydrosulfide, part of the nickel content too is separated and removed as nickel sulfide. While nickel is an impurity from the viewpoint of purification, nickel is a valuable metal and its high rate separation and recovery as nickel sulfide from the system is desirable.

In view of the above, the research has been further continued to provide a method whereby nickel can be separated and recovered at a high rate from the circulated copper electrolytic solution in a copper electrorefining system established for the production of high purity electrolytic copper from crude copper.

As a result, (1) Contacting a copper electrolytic solution with hydrogen sulfide gas separates and removes copper, arsenic, antimony, and bismuth in the form of sulfides from the solution, but nickel remains unremoved; and (2) When sodium hydrosulfide is added to the copper electrolytic solution after the separation and removal of sulfide of copper, arsenic, antimony, and bismuth, nickel can be separated and recovered as nickel sulfide. The proportion of nickel is not large, with few impurities other than sulfur. The recovered nickel sulfide, once freed from excess sulfur, would generally have a high enough quality level to be directly put on the market as a final product.

In a second aspect of the invention, a method of purifying cooper electrolytic solution being circulated in a copper electrorefining system wherein a portion of the electrolytic solution is withdrawn from the system and is recycled to the system after having been subjected to purification treatment for preventing the buildup of impurities in the copper electrolytic solution. This method requires contacting the copper electrolytic solution with hydrogen sulfide gas to separate and remove sulfides of copper, arsenic, antimony, and bismuth from the solution, and then dividing the solution into two portions. The first portion of the solution is recycled to the electrorefining system, and excess sodium hydrosulfide is added to the second portion of the solution to separate and recover nickel as nickel sulfide. Resulting hydrogen sulfide gas is utilized for contact with the copper electrolytic solution to be treated next.

It is also possible, after the separation and recovery of nickel, as nickel sulfide, to add slaked lime or calcium carbonate to the copper electrolytic solution. Sulfuric acid in the solution reacts with lime or calcium carbonate to form gypsum. It is then possible to separate and remove the gypsum from the solution. Thereafter sodium carbonate or caustic soda is added and the separation and recovery of residual nickel from the solution—as nickel carbonate or nickel hydroxide, respectively.—can be accomplished.

As in the first method, a portion of the copper may be separated and recovered from the copper electrolytic solution by electrowinning of by thermal concentration of the solution prior to the separation and removal of sulfides of copper, arsenic, antimony, and bismuth from the electrolytic solution through the contact of the solution with hydrogen sulfide gas. The procedure brings the advantage of reducing the consumption of sodium hydrosulfide and hydrogen sulfide gas and also decreasing the amounts of the sulfides formed, such as copper sulfide.

The term "copper electrolytic solution" is used to comprehensively mean a copper electrolytic solution as withdrawn from an electrorefining system, as well as the copper electrolytic solution from which a portion of copper has been separated and recovered in advance by electrowinning.

DETAILED DESCRIPTION OF THE INVENTION

In copper electrorefining, the concentration of copper in the electrolytic solution gradually increases since the quantity of copper dissolved from an anode is generally larger than that of copper deposited on a cathode. The increase of copper concentration beyond a predetermined level prevents optimal electrorefining. on the other hand, arsenic, antimony, bismuth, iron and the like included in the copper anode are dissolved into the electrolytic solution. When these impurity ions build up beyond a certain level, they precipitate on the cathode and lower the grade of the electrolytic copper produced. Further, nickel functions to raise electrolytic voltage and antimony exhibits adverse effects such as floating due to hydrolysis. For these reasons, it becomes important to purify the copper electrolytic solution circulated in a copper electrorefining system. This can be accomplished by having a portion of the electrolytic solution withdrawn from the electrolytic tank and recycled to the tank after having been subjected to purification treatment.

Figure 1:
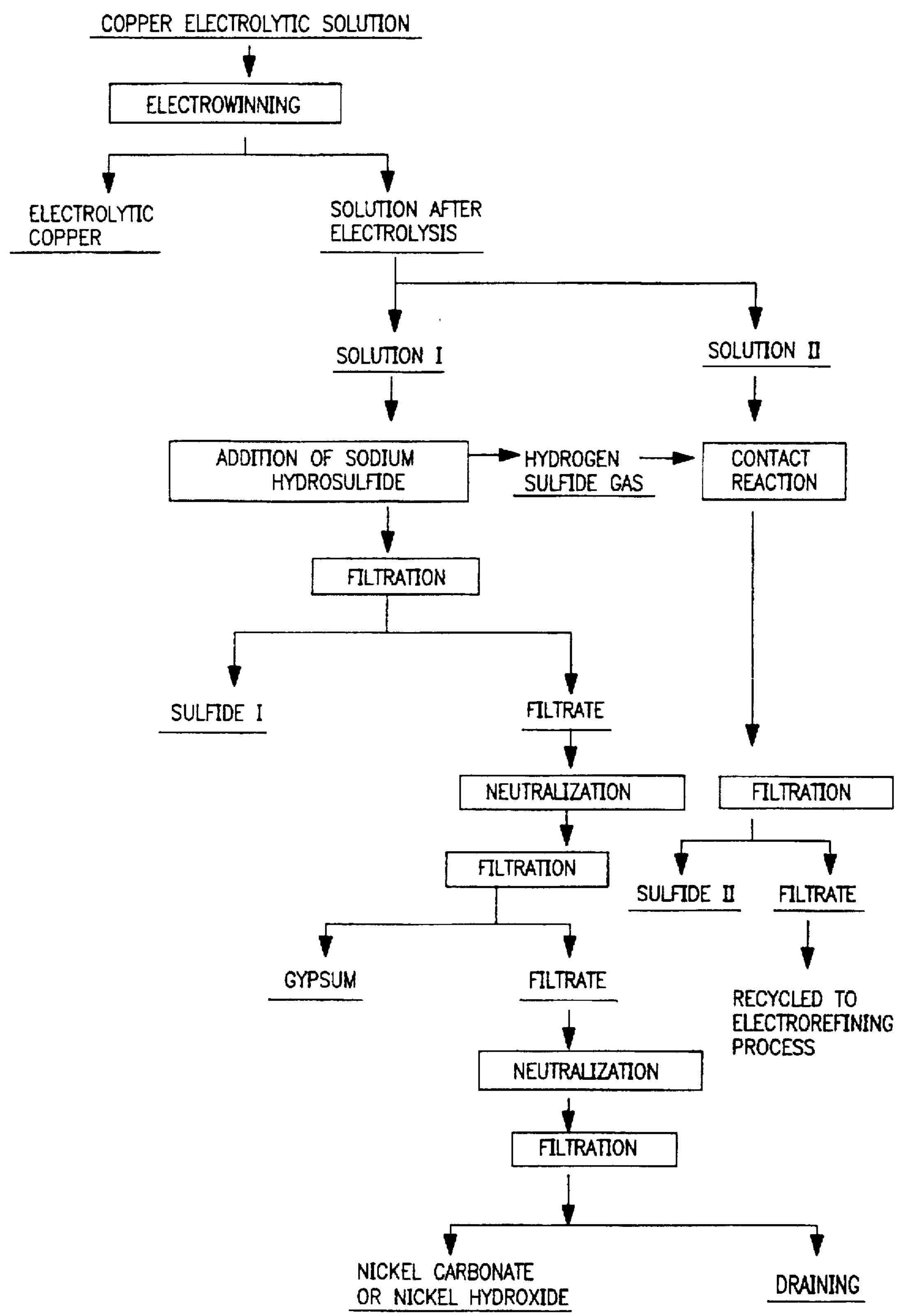
FIG. 1 is a flow sheet of a process for purification of a copper electrolytic solution according to the first aspect of this invention.

FIG. 1 is a flow sheet of a process for purification of a copper electrolytic solution according to the first aspect of this invention. An electrolytic solution from an electrorefining factory (which is herein indicated as a copper electrolytic solution from which a portion of copper has been separated and recovered by an electrowinning step, but this step may be omitted.) is divided into two portions. The first divided portion of the solution (solution I) is passed to a sodium hydrosulfide adding tank while the second divided portion of the solution (solution II) is passed to a reaction tank. In the tank in which sodium hydrosulfide is introduced, an industrial grade of sodium hydrosulfide is added to solution I to precipitate and separate metals such as copper, arsenic, antimony, and bismuth in the form of sulfides (sulfide I). Excess industrial grade sodium hydrosulfide is further added to solution I for reaction with residual sulfuric acid to generate hydrogen sulfide gas. The hydrogen sulfide gas generated is passed to the reaction tank containing solution II in order to precipitate and separate the sulfides of metals such as copper, arsenic, antimony, and bismuth (sulfide II) from solution II. The filtrate from solution II is recycled to an electrolytic system. Further, it is advantageous that in a neutralization apparatus, slaked lime or calcium carbonate be added to the first divided portion of the solution (solution I), to which sodium hydrosulfide was added, to form and precipitate gypsum. The solution from which the gypsum has been removed is then adjusted to pH 8 to 10 by the addition of an alkali agent (such as sodium carbonate or caustic soda) so that impurities such as nickel, iron, and the like which could not have been fully removed are separated and removed as neutralized precipitate. The precipitate is sent to the refining process as a byproduct, whereas the filtrate is drained off.

The volumetric ratio of the first divided portion of the solution (solution I) to the second divided portion of the solution (solution II) from which recycling electrolytic solution is to be produced may range from 1:2 to 1:10. When the volume of the solution II is too much, the quantity of the recycling electrolytic solution becomes insufficient. When the volume of solution II is excessive, the necessary amount of hydrogen sulfide gas can not be produced. The electrolytic solution from which copper has been removed without treatment typically contains, per liter, about 5 to 20 grams copper, about 1 to 10 g arsenic, about 0.1 to 1 g antimony, about 0.05 to 1.0 g bismuth, about 5 to 20 g nickel, and about 150 to 300 g free sulfuric acid. According to the quantities of impurities involved, the necessary amount of hydrogen sulfide gas is dictated by the volumetric ratio between solution I and solution II.

Hydrogen sulfide gas is generated in the tank to which sodium hydrosulfide is added by allowing the reaction between low-priced sodium hydrosulfide and sulfuric acid remaining in the solution. The resulting hydrogen sulfide gas is directly passed to the reaction tank. Thus, there becomes no necessity for transporting and storing high-priced hydrogen sulfide gas in large quantity, and safe operation can be carried out. It is preferable that the tank to which sodium hydrosulfide is added and the reaction tank are mounted side by side.

Since copper constitutes the large metallic content in a copper electrolytic solution, direct contact of the solution with sodium hydrosulfide produces significant copper sulfide which is to be returned back to the copper refining process. Therefore, it is preferable to remove copper before the addition of sodium hydrosulfide. Suitable methods for the preliminary separation and recovery of copper, the electrowinning process (by which electrolytic copper having more than 99% purity is obtainable) and a concentration process under heating for separation as copper sulfate. In order to enhance the purity of the electrolytic copper to be obtained where electrowinning is adopted, it is found to be beneficial that the electrowinning be preceded by pretreatment of the copper electrolytic solution with an ion exchange resin to remove antimony and/or bismuth.

Figure 2:
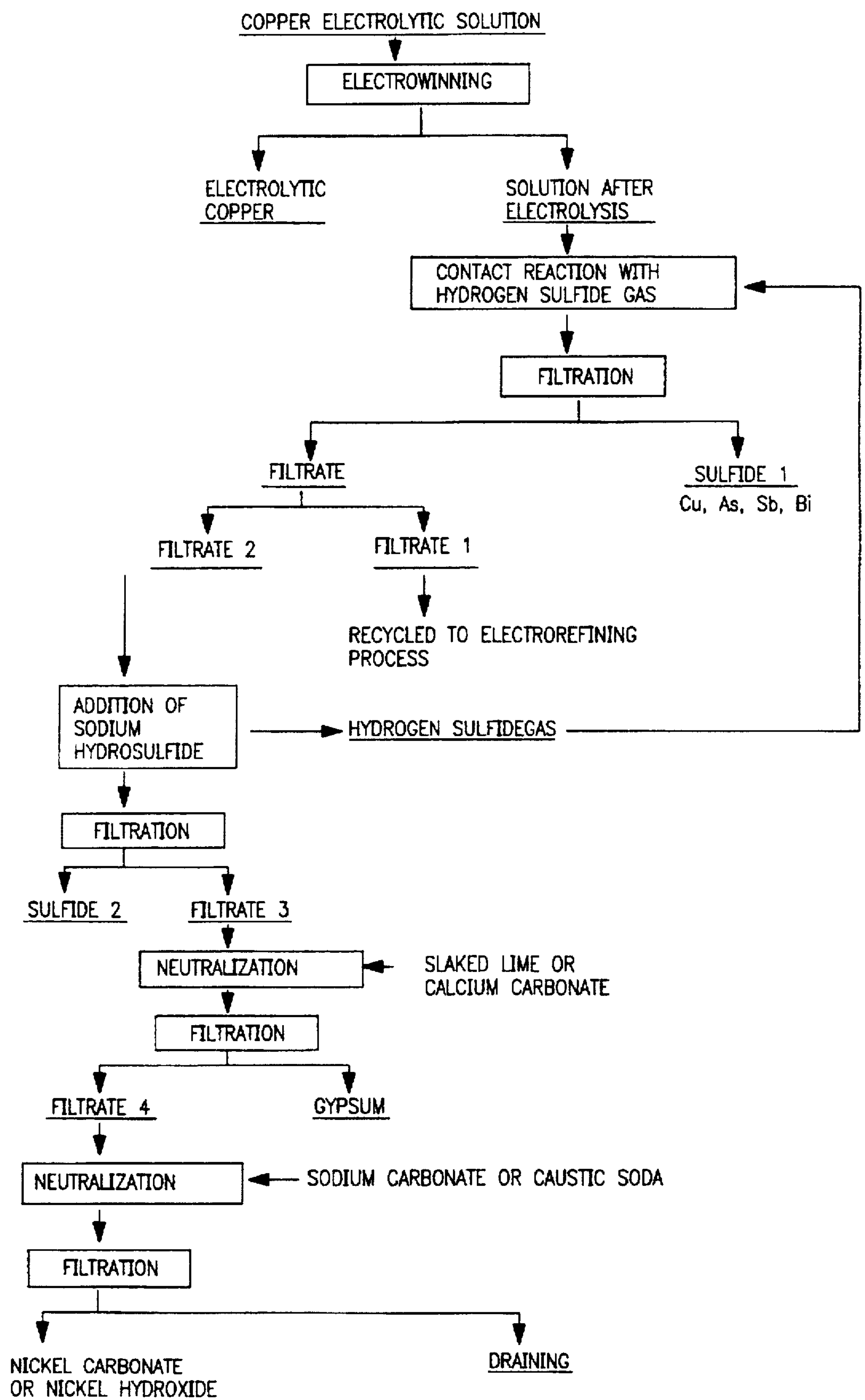
FIG. 2 is a flow sheet of a process for purification of a copper electrolytic solution while recovering nickel according to the second aspect of this invention.

FIG. 2 is a flow sheet of a process for purification of a copper electrolytic solution while recovering nickel according to the second aspect of this invention.

(1) Preliminary recovery of copper by electrowinning.

Similar to the case illustrated in FIG. 1, a portion of copper is separated and recovered in advance from a copper electrolytic solution by electrowinning. In this way, electrolytic copper with a purity of 99% or more can be obtained. Since copper constitutes the largest metallic content in a copper electrolytic solution, direct contact of the solution with hydrogen sulfide gas produces much copper sulfide, along with other sulfides. The process involves large hydrogen sulfide gas consumption and sulfide production. These are advantageously lessened by the preliminary separation and recovery of copper by electrowinning. The electrowinning is also herein preferably preceded by pretreatment of the copper electrolytic solution with an ion exchange resin. The pretreatment prevents contamination from impurities such as antimony and bismuth and accordingly (and advantageously) enhances the purity of the resulting electrolytic copper.

After the treatment, the electrolytic solution typically contains, per liter, about 5 to 20 grams copper, about 1 to 10 g arsenic, about 0.1 to 1 g antimony, about 0.05 to 1.0 g bismuth, about 5 to 20 g nickel, and about 150 to 300 g free sulfuric acid.

Alternatively, the copper electrolytic solution may be concentrated with heat so that the copper content can be partly separated and recovered, in advance, as copper sulfate.

(2) Removal of copper, arsenic, antimony, and bismuth.

The copper electrolytic solution from which part of the copper has been separated and removed in step (1) above is then brought in contact with hydrogen sulfide gas for reaction with copper, arsenic, antimony, and bismuth in the electrolytic solution. The reaction products formed and precipitated as sulfides are separated and removed from the solution by a conventional filtration technique. The quantity of hydrogen sulfide gas to be used depends on the arsenic and other impurity contents. Usually it is larger than the theoretical quantity required for the formation of the sulfides by about 0.1 to 5%. The nickel content in the sulfides thus separated is zero or significantly close to zero.

(3) Division of the copper electrolytic solution

The filtrate that has resulted from the separation and removal of copper and the like as sulfides is divided into two liquid portions; the first solution (filtrate 1) and the second solution (filtrate 2). The first solution (filtrate 1) is essentially free of copper, arsenic, antimony, and other contents and its adjusted composition is suitable for copper electrorefining, as it has passed through the steps (1) and (2). The first solution is recycled as a purified solution to the copper electrorefining process. Actually, the copper, arsenic, and antimony concentrations in the solution thus purified are each less than 0.1 g per liter.

The second solution (filtrate 2) is furnished for the recovery of nickel. The ratio of the first solution (filtrate 1) to the second solution (filtrate 2), which will be described in detail later, desirably ranges from about 2:1 to about 5:1 in view of the fact that they are required in actual operation to produce only the necessary amount of hydrogen sulfide gas.

(4) Generation and utilization of hydrogen sulfide gas/ Formation and recovery of nickel sulfide The addition of sodium hydrosulfide to the second solution (filtrate 2) causes its reaction with residual sulfuric acid to generate hydrogen sulfide gas, which in turn is recovered for utilization in the step (1). Thus hydrogen sulfide gas, which is a highly toxic gas, can be produced only in the necessary amount at the reaction site. The quantity of the hydrogen sulfide gas needed is predetermined, and sodium hydrosulfide is added to the second solution (filtrate 2) to an excess just necessary for the generation of the gas. As the hydrogen sulfide gas is generated from the addition of sodium hydrosulfide to the second solution (filtrate 2), about 5 to 30% by weight of nickel in the solution is produced as nickel sulfide and recovered from the solution. The nickel sulfide so recovered is almost free from impurities, excepting sulfur, and is useful in itself as nickel raw material.

(5) Formation and recovery of nickel carbonate or nickel hydroxide

The second solution (filtrate 3), from which nickel has been separated and recovered as nickel sulfide by passage through the step (4) above, is first adjusted to a pH of about 1.5 to 2.5. This pH adjustment is accomplished by the addition of slaked lime or calcium carbonate. Slaked lime or calcium carbonate react with free sulfuric acid remaining in the solution to form and precipitate gypsum. The gypsum that has precipitated is separated and removed in a conventional way.

The solution (filtrate 4), from which the gypsum has been removed, is adjusted to a pH of about 8 to 10 by the addition of sodium carbonate or caustic soda. As a result, the nickel remaining in the solution is precipitated in the form of nickel carbonate or nickel hydroxide, respectively. The nickel carbonate or nickel hydroxide thus produced is conventionally separated and recovered. The nickel purity is about 35 to 45%. After the nickel recovery, the solution is drained off.

reaction with the solution formed and precipitated sulfide II. The sulfide II was filtered, separated, recovered, and dried by conventional method. The remaining filtrate (i.e., the electrolytic solution to be recycle) contained at most 0.1 g each of copper , arsenic, antimony, and bismuth. The remaining filtrate was therefore "clean".

After the generation of hydrogen sulfide gas, and after removing a very small quantity of hydrogen sulfide remaining in the solution, solution I was filtered to recover sulfide in the usual manner. Solution I was then adjusted to pH 2 for neutralization by the addition of 1280 kg calcium carbonate. The reaction of the calcium carbonate with remaining free sulfuric acid in the solution formed and precipitated gypsum. The precipitated gypsum was separated and removed by conventional method. The amount of gypsum, when dried, was 2210 kg. Following the removal of the gypsum, the filtrate was neutralized to pH 9 by the addition of 125 kg sodium carbonate. Remaining nickel in the solution was thus precipitated in the form of nickel carbonate. Thereafter, the nickel carbonate was conventionally filtered, separated, recovered, and dried.

The quantities of the treating solution, as well as the quantities for the products in the individual steps and the solution after treatment, for the treatment procedure described above, are shown in Table 1.

TABLE 1

| | Q'ty | Cu | | Ni | | As | | Sb | |
|---|---|---|---|---|---|---|---|---|---|
| In | $m^3$ | g/l | kg | g/l | kg | g/l | kg | g/l | kg |
| Electrolytic solution | 30 | 45 | 1350 | 15 | 450 | 5 | 150 | 0.5 | 15 |
| Out | kg | % | kg | % | kg | % | kg | % | kg |
| Electrolytic copper I | 450 | 99.9 | 450 | | | | | | |
| Electrolytic copper II | 606 | 99 | 600 | | | | | | |
| Sulfide I | 237 | 28.3 | 67 | 17.0 | 40 | 14.3 | 34 | 1.4 | 3 |
| Sulfide II | 608 | 38.3 | 233 | 0 | 0 | 19.1 | 116 | 1.9 | 12 |
| Nickel carbonate | 151 | 0 | 0 | 40 | 60 | 0 | 0 | 0 | 0 |
| Electrolytic solution recycled* | 23.3 | 0 | 0 | 15 | 350 | 0 | 0 | 0 | 0 |

*in units of $m^3$ and g/l.

EXAMPLE 1

A copper electrolytic solution (30 $m^3$) containing 45 g copper per liter was treated by a known electrowinning process, and 450 kg of electrolytic copper I (with a purity of 99.9%) and 606 kg of electrolytic copper II (with a purity of 99%) were separated and recovered. The solution after the electrolysis contained, per liter, 10 g copper, 5 g arsenic, 0.4 g antimony, 0.1 g bismuth, 15 g nickel, and 244 g free sulfuric acid.

The electrolytic solution was divided into two portions: solution I (2/9 of total volume, 6.7 $m^3$) and solution II (7/9 of the total volume, 23.3 $m^3$). 500 kg of industrial sodium hydrosulfide containing about 25% NaSH was added to solution I to form and precipitate sulfide I. Next, 2050 kg of industrial sodium hydrosulfide was added a the rate of about 10 kg per minute and allowed to react with sulfuric acid in the solution to generate hydrogen sulfide gas. This hydrogen sulfide gas was directed to solution II, and its contact

EXAMPLE 2

(1) Preliminary recovery of copper by electrowinning

A copper electrolytic solution (30 $m^3$) containing 45 g copper per liter was treated by a known electrowinning process, and 450 kg of electrolytic copper 1 having a purity of 99.9% and 606 kg of electrolytic copper 2 having a purity of 99% were separately recovered. The solution after the electrolysis contained, per liter, 10 g copper, 5 g arsenic, 0.4 g antimony, 0.1 g bismuth, 15 g nickel, and 244 g free sulfuric acid.

(2) Removal of copper, arsenic, antimony, and bismuth

With the introduction of 225 $m^3$ hydrogen sulfide gas into the electrolytic solution after the electrolysis, a contact reaction was effected between the solution and the gas to form and precipitate a sulfide 1. The precipitate was separated and removed by a conventional filtration technique. Sulfide 1 was substantially free from nickel. The resulting filtrate was clean, with the copper, arsenic, antimony, and bismuth concentrations of but 0.1 g or less each per liter.

(3) Division of the copper electrolytic solution

From the filtrate, a portion of 23.3 $m^3$ was separated off as a purified solution (filtrate 1) for recycling to electrorefining process.

(4) Generation and utilization of hydrogen sulfide gas/ Formation and recovery of nickel sulfide To the remaining 6.7 $m^3$ portion of the filtrate was added 2470 kg of industrial sodium hydrosulfide containing about 25% NaSH at the rate of about 10 kg per minute to react free sulfuric acid remaining in the solution. The resulting reaction generated 225 $m^3$ hydrogen sulfide gas. The hydrogen sulfide gas generated was passed to step 2 and utilized to precipitate copper, arsenic, antimony, and bismuth. The addition of sodium hydrosulfide resulted in the precipitation of a portion of nickel in the solution as nickel sulfide. After removing a very small quantity of hydrogen sulfide remaining in the solution, the nickel sulfide was separated and recovered by conventional method. The nickel sulfide, after drying, was 80 kg.

(5) Formation and recovery of nickel carbonate or nickel hydroxide

The solution (filtrate 3) from which the hydrogen sulfide gas has been generated and recovered was first adjusted to pH 2 by the addition of 1270 kg calcium carbonate. The calcium carbonate reacts with free sulfuric acid remaining in the solution to form and precipitate gypsum. The gypsum that precipitated was separated and removed by a conventional method. The amount of gypsum, upon drying, was 2180 kg. Following the removal of the gypsum, the solution (filtrate 4) was adjusted to pH 9 for neutralization by the addition of 161 kg sodium carbonate, so that the nickel remaining in the solution was precipitated in the form of nickel carbonate. The nickel carbonate thus formed was conventionally separated by filtration and recovered. The nickel carbonate, when dried, amounted to 200 kg and the purity of nickel was 40%.

Throughout the treatment procedure described above, the quantities of the treating solution, as well as the quantities of the products in the individual steps and the solution after treatment were as shown in Table 2.

TABLE 2

| | Q'ty | Cu | | Ni | | As | | Sb | |
|---|---|---|---|---|---|---|---|---|---|
| In | $m^3$ | g/l | kg | g/l | kg | g/l | kg | g/l | kg |
| Electrolytic solution | 30 | 45 | 1350 | 15 | 450 | 5 | 150 | 0.5 | 15 |
| Out | kg | % | kg | % | kg | % | kg | % | kg |
| Electrolytic copper 1 | 450 | 99.9 | 450 | | | | | | |
| Electrolytic copper 2 | 606 | 99 | 600 | | | | | | |
| Sulfide 1 | 783 | 38.3 | 300 | 0 | 0 | 19.1 | 150 | 1.9 | 15 |
| Sulfide 2 | 80 | 0 | 0 | 25.0 | 20 | 0 | 0 | 0 | 0 |
| Nickel carbonate | 200 | 0 | 0 | 40 | 80 | 0 | 0 | 0 | 0 |
| Electrolytic solution recycled* | 23.3 | 0 | 0 | 15 | 350 | 0 | 0 | 0 | 0 |

*in units of $m^3$ and g/l.

A comparison between Tables 1 and 2 indicates that according to the method of Example 1, nickel mostly precipitates as a sulfide together with copper, arsenic, etc., leaving only a little proportion of nickel for recovery as nickel carbonate. In contrast, the method of Example 2 permits the recovery of nickel as nickel sulfide and nickel carbonate with an increased quantity.

EXAMPLE 3 (pretreatment with an ion exchange resin)

A copper electrolytic solution containing, per liter, 45 g copper, 5 g arsenic, 0.4 g antimony, 0.1 g bismuth, 15 g nickel, and 190 g free sulfuric acid, was withdrawn and passed through an ion exchange resin (a product of Miyoshi Resin Co. marketed under the trade designation "EPOROUS MX-2") for partial adsorption of antimony and bismuth from the solution. After the passage through the resin, the solution contained, per liter, 45 g copper, 5 g arsenic, 0.1 g antimony, 0.05 g bismuth, 15 g nickel, and 190 g free sulfuric acid. This solution was treated by electrowinning in the manner described in step (1) of Example 2. Due to the lowered antimony and bismuth concentrations in the solution, 600 kg of electrolytic copper with a purity of 99.9% and 450 kg of electrolytic copper with a purity of 99% were obtained.

This invention was succeeded in establishing an industrially feasible method useful as a purifying method of a copper electrolytic solution being circulated in a copper electrorefining system. This invention takes the place of the separation method of arsenic, antimony, and bismuth dependent upon electrowinning and the evolution of highly toxic arsine gas. Since high-priced hydrogen sulfide gas is produced only in the necessary amount through the reaction of low-priced sodium hydrosulfide with sulfuric acid remaining in the solution and is directly passed to the reaction tank with easier handling, it is not necessary to transport and store high-priced hydrogen sulfide gas in large quantities. Further, safe and efficient operation can be carried out. According to the second flow, nickel may be efficiently recovered as nickel sulfide and nickel carbonate.

We claim:

1. A method of purifying a sulfuric acid-containing copper electrolytic solution being circulated in a copper electrorefining system wherein a portion of the electrolytic solution is withdrawn from the system and is recycled to the system after having been subjected to purification treatment for preventing the buildup of impurities in the copper electrolytic solution comprising:

dividing the withdrawn electrolytic solution into first and second solution portions, adding sodium hydrosulfide to the first solution portion to precipitate and separate metals including copper, arsenic, antimony, and bismuth from the first solution portion in the form of sulfides, further adding excess sodium hydrosulfide to the first solution portion for reaction with residual sulfuric acid in the solution to generate hydrogen sulfide gas, contacting the second solution portion with the hydrogen sulfide gas thus produced to precipitate and separate metals including copper, arsenic, antimony, and bismuth from the second solution portion in the form of sulfides, filtering the second solution portion to separate the precipitated sulfides from the second solution portion, recycling the filtrate from the second solution portion to the electrorefining system.

2. The method of claim 1 wherein alkali agent is added to the first solution portion to which sodium hydrosulfide was added so that heavy metal impurities which were not removed are separated and removed from the first solution portion as a neutralized precipitate.

3. The method of claim 1 or 2 wherein copper is recovered from the withdrawn copper electrolytic solution by electrowinning prior to the division of the copper electrolytic solution.

4. The method of claim 3 wherein the copper electrolytic solution is passed through an ion exchange resin to allow a portion of the antimony and/or bismuth in the solution to adsorb on the resin for separation prior to recovering copper from the withdrawn electrolytic solution by electrowinning.

5. The method of claim 1 or 2 wherein the withdrawn copper electrolytic solution is heated to evaporate water and to precipitate and separate copper as copper sulfate prior to the division of the copper electrolytic solution.

6. A method of purifying a sulfuric acid-containing copper electrolytic solution being circulated in a copper electrorefining system wherein a portion of the electrolytic solution is withdrawn from the system and is recycled to the system after having been subjected to purification treatment for preventing the buildup of impurities in the copper electrolytic solution, the method comprising:

contacting the withdrawn portion of the copper electrolytic solution with hydrogen sulfide gas to separate and remove copper, arsenic, antimony, and bismuth from the solution in the form of sulfides, dividing the solution into first and second solution portions, wherein the first solution portion is recycled to the electrorefining system, adding excess sodium hydrosulfide to the second solution portion to separate and recover nickel as nickel sulfide therefrom, wherein the withdrawn portion of the copper electrolytic solution to be treated is contacted in said contacting step with hydrogen sulfide gas generated from the addition of sodium hydrosulfide to the second solution portion.

7. The method of claim 6 wherein after the separation and recovery of nickel as nickel sulfide by the addition of sodium hydrosulfide, slaked lime or calcium carbonate is added to the copper electrolytic solution for reaction with sulfuric acid in the solution to form gypsum, the gypsum is separated and removed from the solution, and sodium carbonate or caustic soda is added to the solution to separate and recover residual nickel as nickel carbonate or nickel hydroxide from the solution.

8. The method of claim 6 wherein a part of the copper in the copper electrolyte solution is separated and recovered from the solution by electrowinning or concentration under heating of the solution prior to the separation and removal of copper, arsenic, antimony, and bismuth in the form of sulfides from the electrolytic solution through the contact of the solution with hydrogen sulfide gas.

* * * * *